UNITED STATES PATENT OFFICE.

GEORGE B. BURNHAM, OF BOROSOLVAY, CALIFORNIA.

PROCESS OF RECOVERING POTASSIUM SODIUM SULFATE FROM SALINE LIQUORS.

1,317,954.     Specification of Letters Patent.     Patented Oct. 7, 1919.

No Drawing.     Application filed June 16, 1919. Serial No. 304,498.

*To all whom it may concern:*

Be it known that I, GEORGE B. BURNHAM, a citizen of the United States, residing at Borosolvay, in the county of San Bernardino and State of California, have invented a certain new and useful Improvement in Processes of Recovering Potassium Sodium Sulfate from Saline Liquors, of which the following is a specification.

This invention relates to the process of recovering potassium sodium sulfate from saline liquors containing potassium, sodium, chlorid, and sulfate ions, and saturated, or nearly saturated, with potassium sodium sulfate and sodium chlorid.

An object of the invention is to provide a cheap process for recovering potassium sodium sulfate from saline liquors and also to recover the potassium sodium sulfate as free from sodium chlorid as possible.

The invention possesses other advantageous features, some of which, with the foregoing, will be set forth in the following description, where I shall outline in full one form of the process of my invention. I shall describe the process as applied to Searles Lake in California, but it is to be understood that the process is not limited to this particular brine. Searles Lake brine contains sodium, potassium, chlorid, sulfate, carbonate, and borate ions.

I prefer to make use of natural evaporation and natural temperatures, but artificial evaporation and artificial temperatures may also be employed.

Hitherto, when potassium sodium sulfate and sodium chlorid crystallize out of solution at the same time, the separation of the potassium sodium sulfate from the sodium chlorid has been effected by mechanical means making use of the difference in size and shape of the crystals, etc. By my improved process, however, I cause most of the potassium sodium sulfate and the sodium chlorid to crystallize out in separate ponds, or vats.

In the preferred form of my process it is first necessary that the brine be saturated, or nearly saturated, with both sodium chlorid and potassium sodium sulfate. This can be accomplished with Searles Lake brine by the following methods:—

In the first method, the lake brine is cooled in shallow ponds during winter to eliminate a portion of the excess sodium sulfate from the brine. The brine is then transferred to deep ponds to evaporate during summer. The amount of sodium sulfate that will be removed during winter cooling depends upon weather conditions and in the skill in manipulation of the brine, but usually sufficient sulfate is still left in the brine to cause saturation of both sodium chlorid and potassium sodium sulfate upon evaporation during the spring, or summer.

Another method of obtaining the lake brine saturated with both sodium chlorid and potassium sodium sulfate is to evaporate the brine late in the spring and in the summer at as high a temperature as is possible to eliminate a portion of the excess sulfate from the brine in the form of the double salt, sodium carbonate sulfate. This can be accomplished by flowing the brine into shallow ponds in the morning to evaporate during the heat of the day and flowing the brine into deep ponds in the evening so as to retain its warm temperature during the night. The deep ponds hold the brine in a compact volume and minimize radiation. The next morning the brine is again flowed out onto shallow ponds to evaporate during the day and again flowed into deep ponds at night. Sodium carbonate sulfate and sodium chlorid crystallize out. The procedure is continued until the brine becomes saturated with potassium sodium sulfate.

Having thus brought the brine to saturation with potassium sodium sulfate and sodium chlorid by either of the above methods, or by any other method, I am in a position to proceed with my process, in its preferred form, as follows:—

A portion of the brine which is saturated with potassium sodium sulfate and sodium chlorid is removed to a shallow pond in the early part of the morning. The main portion of the brine is kept in a deep storage pond to minimize evaporation. The brine in the shallow pond evaporates during the warmth of the day. As the brine is only a few inches deep the rate of evaporation will be fairly rapid in proportion to the volume of the brine. Some sodium chlorid will crystallize out in this shallow pond, and very little, if any, potassium sodium sulfate will be deposited. The fact that the latter salt does not crystallize out to any appreciable extent is no doubt due to a state of supersaturation of the potassium sodium sulfate during the relatively rapid evaporation in the few hours of the day, and perhaps also, to the rather warm temperature of evaporation in the heat of the sun. The solubility of potassium sodium sulfate is apparently a little greater with increase in temperature than sodium chlorid. Some of the sodium chlorid also tends to be supersaturated.

In the evening, when sufficient evaporation has occurred, the warm brine is agitated by means of pumping it from the shallow ponds into a settling pond. The agitation of pumping crystallizes out the supersaturated sodium chlorid but not any appreciable potassium sodium sulfate.

It is believed that the double salt of potassium requires considerable time for the formation of its crystals even though it may be in a state of supersaturation.

The brine is allowed to stand in the settling pond just long enough for the sodium chlorid to settle to the bottom. The warm brine is then removed to another pond where it cools and is allowed to stand over night and potassium sodium sulfate slowly crystallizes out. Only relatively small amounts of sodium chlorid crystallize out with the potassium sodium sulfate.

If desired, after the sodium chlorid has settled out, the warm brine may be added and mixed with the main supply of brine in the deep storage pond. Some cooling is effected and this together with supersaturation causes the potassium sodium sulfate to accumulate in the deep storage pond. A small amount of water can be added to prevent concentration of the brine and the evaporation of this excess water aids in keeping this pond cool.

The next morning more brine is flowed onto the shallow ponds and the process repeated. Only a portion of the total brine is carried through the daily cycle in the shallow ponds and this is continually being mixed with the main supply of brine.

The relative yield in potassium sodium sulfate during each daily cycle is not very large as the cooling and the effect of supersaturation only crystallizes out a small portion of the potassium sodium sulfate. However, as large quantities of brine are used and the process usually continued to the end of summer, a large proportion of the potassium sodium sulfate is eventually recovered.

It is not certain how much of the potassium sodium sulfate is crystallized out due to supersaturation and how much is due to cooling. The solubility of the double salt changes only slightly with change of temperature and it is therefore difficult to distinguish between effects of supersaturation and effects of cooling.

Another variation in the method of crystallizing the sodium chlorid separate from the potassium sodium sulfate may be used in which the shallow daily heating ponds are done away with. The brine which is saturated with potassium sodium sulfate and sodium chlorid is kept in a deep evaporating pond in which it evaporates relatively slowly, but even with this slow evaporation the brine is still in a state of more or less slight supersaturation. While the brine is supersaturated with sodium chlorid it is pumped continuously, or at frequent intervals, into a settling pond and from there it flows back into the deep evaporating pond. The agitation of the pumping quickly crystallizes out sodium chlorid which settles to the bottom of the settling pond and the clear liquor flows back into the deep evaporating pond where potassium sodium sulfate slowly crystallizes out. The cycle of operation is repeated continuously with the result that most of the sodium chlorid is deposited in the settling pond and most of the potassimu sodium sulfate crystallizes out in the deep evaporating pond.

I claim:

1. The process of recovering potassium sodium sulfate from liquors containing potassium, sodium, chlorid, and sulfate ions, which consists in evaporating the liquor, agitating the liquor to remove supersaturated sodium chlorid, removing the liquor from the deposited crystals and allowing the liquor to slowly crystallize out supersaturated potassium sodium sulfate.

2. The process of recovering potassium sodium sulfate from liquors containing potassium, sodium, chlorid, and sulfate ions, which consists in evaporating the liquor, agitating the liquor to remove supersaturated sodium chlorid, removing the liquor from the deposited crystals and cooling the liquor to crystallize out potassium sodium sulfate.

3 The process of recovering potassium sodium sulfate from liquors containing potassium, sodium, chlorid, and sulfate ions, which consists in evaporating the liquor, removing and agitating the liquor to deposit supersaturated sodium chlorid, removing the liquor from the deposited crystals, adding water to the liquor, evaporating the added water and thereby cooling the liquor to crystallize potassium sodium sulfate.

4. The process of recovering potassium sodium sulfate from liquors saturated with sodium chlorid and potassium sodium sulfate, which consists in evaporating the liquor, agitating the liquor to quickly crystallize out supersaturated sodium chlorid, removing the liquor from the deposited crystals, slowly crystallizing out potassium sodium sulfate and recovering the potassium sodium sulfate.

GEORGE B. BURNHAM.